Nov. 27, 1934.  J. L. HODGSON ET AL  1,982,053
AUTOMATIC RECORDING AND/OR CONTROLLING APPARATUS
Original Filed Nov. 27, 1931  2 Sheets-Sheet 1
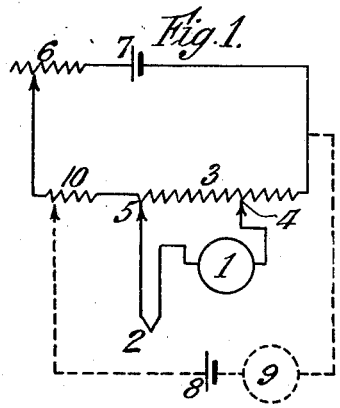
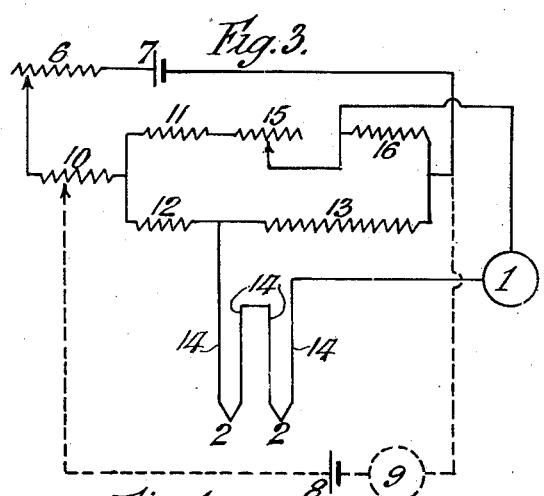
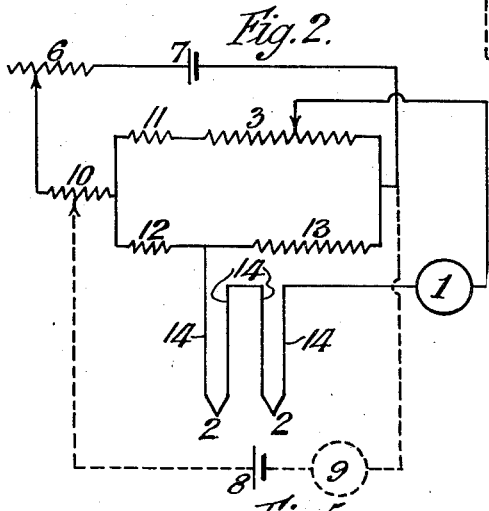
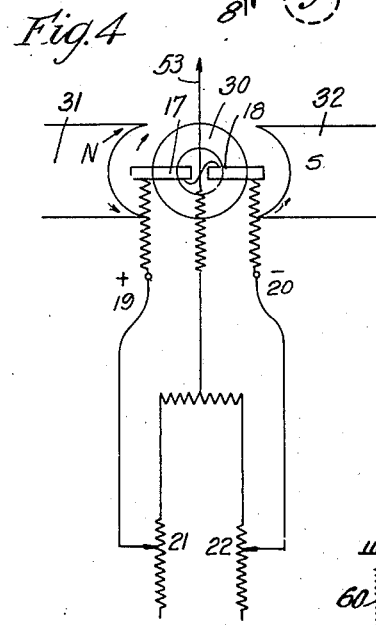
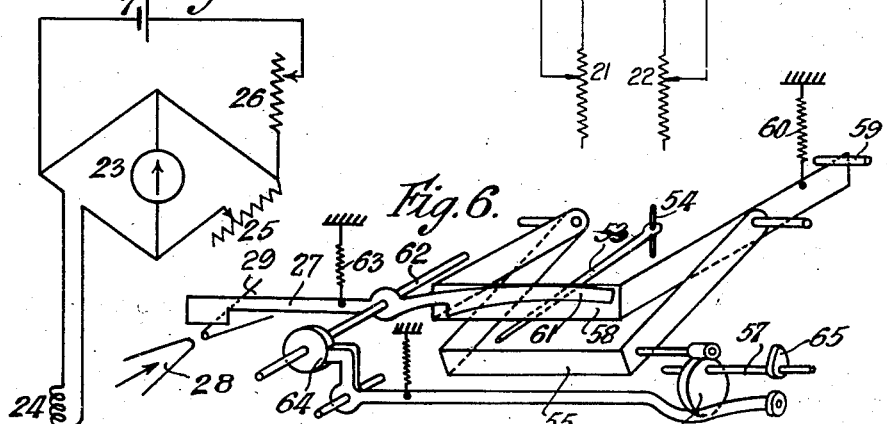
Inventors:
J. L. Hodgson, G. P. E. Howard,
and H. Ivanoff
By Baldwin Wight Attorneys.

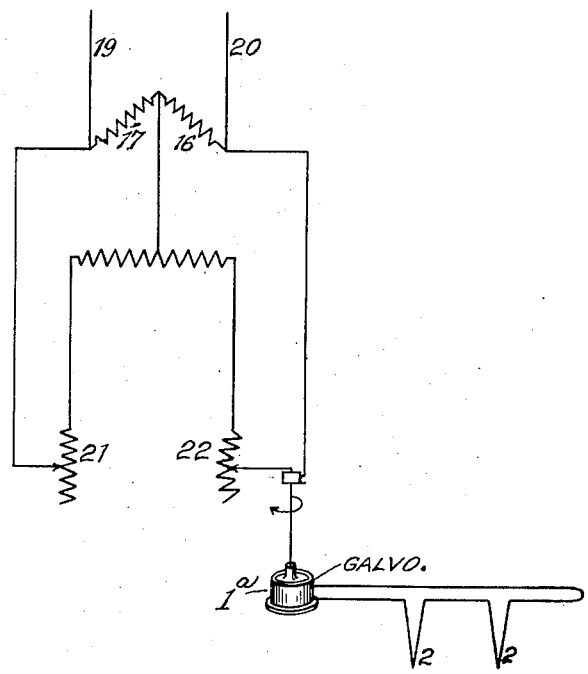

Patented Nov. 27, 1934

1,982,053

UNITED STATES PATENT OFFICE 1,982,053

AUTOMATIC RECORDING AND/OR CONTROLLING APPARATUS

John Lawrence Hodgson, Giles Philip Eliot Howard, and Alexander Ivanoff, Biscot Road Works, Luton, England, assignors to George Kent Limited, London, England Original application November 27, 1931, Serial No. 577,656. Divided and this application October 18, 1932, Serial No. 638,398

8 Claims. (Cl. 236—70)

This application is a division of our application No. 577,656 filed 27th November, 1931.

The present invention relates to automatic indicating and/or recording and/or controlling apparatus and has for its object to improve the accuracy of apparatus influenced by or capable of causing voltage or potential difference, such as a voltage controller; the invention is in particular concerned with apparatus for the automatic indicating and/or recording and/or controlling of temperatures, (the temperatures being measured by means of thermo-couples or resistance or radiation pyrometers) or of flows whose rate is made to cause a voltage variation.

The apparatus generally employed in conjunction with thermo-couples or resistance pyrometers falls into one of two classes, one depending on the readings of a self-balancing potentiometer and the other employing a direct-reading galvanometer.

In carrying out the present invention the advantages of these two types are combined by employing a potentiometer which is set by hand to correspond to any desired temperature or other condition to be controlled and indicating and/or controlling and/or recording means which are actuated through the medium of a galvanometer pointer or its equivalent which takes up a position dependent on the amount of the out-of-balance current due to the departure of the temperature or other condition from the desired value, the indication, record or control being dependent on the deviation of the pointer.

The potentiometer current may be standardized at intervals by comparing the fall of potential across any part of the circuit with the voltage of a standard cell, thus insuring the accuracy of the instrument.

The advantages of the method according to the invention over the existing methods can be summarized as follows: firstly, the expensive self-balancing mechanism of the automatic potentiometer is not required; secondly it lends itself particularly to automatic compensation for the cold junction, the compensation being obtained by virtue of the variation of the electrical resistance of a part of the circuit with the cold junction temperature. Thirdly, the galvanometer or the like which is required to cover only a comparatively narrow band of temperatures in the vicinity of the set temperature or other value may be of great sensitivity admitting of very accurate methods of control being employed. Fourthly, as the potentiometer principle is incorporated in the apparatus according to the present invention, means can be provided for taking into account the varying characteristics of the thermo-couples or other measuring units by varying the resistance, the potential drop across which is compared with the voltage of a standard cell when standardizing, thus varying the current through the potentiometer.

When the apparatus is intended mainly to indicate, record or control a deviation from a certain set value of temperature for example, no great accuracy of indication is required if the deviation is at all large, so that the accuracy of galvanometer calibration will not be of much importance.

The invention is illustrated in the accompanying drawings in which Figs. 1-5 illustrate various circuit arrangements which can be employed; Fig. 6 illustrates an apparatus for providing a record and/or for effecting control; and Fig. 7 diagrammatically illustrates the circuit arrangement for controlling the ratiometer circuit.

One arrangement of circuit for use in temperature control is shown in Fig. 1 in which 1 is the galvanometer and 2 a thermocouple responsive to temperature variation; the galvanometer and the thermocouple are connected in circuit and are connected across a resistance 3 at variable tapping points 4, 5 the resistance forming part of a potentiometer circuit which also includes a resistance 6 and an accumulator 7 the resistance being variable to enable the circuit to be standardized. The variable tapping point 4 is set by hand to correspond to any desired temperature while the variable tapping point 5 enables compensation to be made manually for variation in cold junction temperature. It will be seen that the galvanometer pointer will take up a position dependent upon the departure of the temperature from the set value thereof.

A standard cell 8 and galvanometer 9 may be provided and an adjustable calibrated resistance 10 included in the potentiometer circuit, this arrangement enabling adjustment to be made of the thermocouple factor. The resistance 10 is adjusted so that zero deflection is indicated by the galvanometer 9; if now the thermocouple which was employed at the time when this test was made be replaced by a second similar thermocouple, then if the galvanometer 9 still indicates zero deflection, the two thermocouples have similar characteristics; if, however, by reason of the employment of the new thermocouple, there is a deviation of the galvanometer 9, it is necessary to adjust the resistance 6 so as to compensate the circuit for the different characteristics between the two thermocouples. Moreover, the circuit including the battery 8 and galvanometer 9 could be employed to ascertain whether the output of the battery 7 is varying for, obviously, if at one time with a certain value of resistance 10, the galvanometer 9 indicates zero deflection, and at another time, with the same adjustment of the resistance 10, the galvanometer 9 indicates a deflection, it follows that in the interim, the output from the battery 7 has varied and correction is necessary. The circuit of our invention is particularly useful when the same instrument is used for recording temperatures, say between 20 and 40 degrees F. or between 820 and 840 degrees F. or some other widely displaced temperature, and where a balance point must be obtained with a high degree of precision.

Thus to compensate for the varying characteristics of similar thermocouples the standardized current through the potentiometer resistances may be varied by tapping off a different amount of resistance across which the voltage drop is measured when standardizing, this being effected by an adjustment of the calibrated resistance 10.

In Fig. 2, a modified form of circuit is shown in which automatic compensation for cold junction temperature variation is effected. In this circuit the resistance 3 is connected in series with a resistance 11 and these resistances 3 and 11 are connected in parallel with resistances 12, 13 one lead from the thermocouples being connected to that arm of the circuit which includes the resistances 12, 13.

The resistances are such that the current through each arm is practically the same. With the exception of the resistance 12 which is of nickel, all the resistances are of Constantin which has practically no temperature coefficient. Under normal conditions of temperature the system is balanced. If the atmospheric temperature rises the electro-motive force generated by the thermocouples falls off, but the value of the resistance 12 increases, producing an additional potential drop across the galvanometer. This is employed for compensating for the fall in the electro-motive force due to the cold junction. Compensating leads 14 which are preferably made of the same materials as the thermocouples to which they are attached are brought to a point near to the resistance 12 in the instrument so that the cold junction may be at this point.

Fig. 3 illustrates a modified form of the circuit shown in Fig. 2; in Fig. 3 the resistance 3 is replaced by two resistances 15, 16 and variation of the set value of the temperature is effected by varying the actual value of the resistance 15 instead of, as in Fig. 2, by varying the balance point.

In Fig. 4 there is illustrated a ratiometer arrangement; in this figure 17, 18 indicate the coils of the ratiometer which are supplied from lines 19, 20 and are respectively in circuit with variable resistances 21, 22. The resistance 21 is manually adjustable and is set to a value corresponding to the set value of temperature (or other variable) while the resistance 22 is varied by variation in the value of the variable, as for example by a galvanometer in circuit with a thermocouple. The two coils 17 and 18 are carried by an iron ring 30 of the indicating instrument rotatably mounted between the pole pieces of the indicating instrument shown at 31 and 32 so that the position of the ring 30, and hence of the pointer 53 carried by it, will depend upon the relative values of current flow through the two coils 17 and 18.

Fig. 7 diagrammatically illustrates the ratiometer circuit wherein the resistance 22 is varied by the movement of an arm which is directly controlled by the galvanometer 1ª. The thermocouples 2 are connected in circuit with a galvanometer 1ª for directly controlling the operation of the galvanometer which in turn varies the effective value of the resistance 22.

In Fig. 5 there is illustrated a Wheatstone bridge resistance thermometer circuit. In this figure 23 is the galvanometer, 24 is the resistance thermometer and 25 is the manually adjustable resistance. A variable resistance 26 is provided to enable the current across the bridge to be adjusted and thus to enable the sensitivity of response of the galvanometer to be varied. A similar variation could be effected in the circuits shown in Figs. 1-4: for example in the potentiometer circuit arrangements. This could be effected by providing a shunt (preferably a variable one) for the galvanometer or by providing the magnetic circuit of the galvanometer with a shunt which is preferably variable.

For providing an indication the pointer of the galvanometer or ratiometer could be employed: for automatically providing a record and/or for automatically effecting control, a convenient arrangement would be to clamp the pointer of the galvanometer 1 of Figs. 1-3, the ratiometer referred to with reference to Fig. 4, or of the galvanometer 23 of Fig. 5 periodically at the horizontally deflection it has, by means of a gate arrangement and to raise or depress the pointer by the gate arrangement, the pointer influencing, to an extent dependent upon the deflection of the pointer at which it is clamped, the position of a suitably shaped member for actuating a recording device, and/or switches, contacts, resistances, valves or other means influencing the variable which it is desired to control. In order to effect this the apparatus described in our United States Patent No. 1,916,477, dated July 4, 1933 may be employed.

A gate arrangement is illustrated in Fig. 6 in which 53 is the galvanometer or ratiometer pointer which is pivoted about the vertical axis 54 and which is free to move when a jaw member 55 is down in its lowest position as shown in the figure. The jaw member is raised at regular intervals by a cam 56, which is fixed to a shaft 57 driven by a suitable motor (air or electric) at a suitable speed, say one revolution in 20 or 30 seconds. When the jaw member is raised it first of all clamps the pointer (which is flexible so that it can be bent upwards, without damage) between itself and a co-operating jaw member 58 which is normally held up against a stop 59 by means of a spring 60. A further movement of the cam then causes the projecting end of the pointer to engage a cam arm 61 which is pivoted about the axis 62. The cam arm is loaded by a spring 63 but is, however, loosely clamped by a brake 64. Thus, if the projecting end of the pointer as it engages with the cam 61 necessitates that the cam arm shall be further depressed, the pressure of the pointer on the cam 61 is sufficient to overcome the resistance of the brake. The brake is, however, sufficient to overcome the pull of the spring 63 so that a position of the cam arm once taken up will not be lost until the brake is released.

A cam 65 releases the brake once during every revolution of the shaft 57 when the cam 56 has raised the jaw 55 to approximately its highest position. If then the position of the pointer is such that the cam arm should be raised, the spring 63 during its release by the release of the brake pulls the cam arm upwards until the cam 61 is in contact with the pointer after which the brake 64 clamps the cam arm in position.

After the setting operation has been completed the jaw 55 falls and the pointer is free to take up a new position before again being clamped.

It will be seen that the mechanism enables the cam arm to be moved from one position to another in accordance with the angular deflection of the pointer about the axis 54 the exact position of the cam arm depending upon the shape of the cam surface 61. The position of the cam arm is always controlled either by the brake or by the position of the end of the pointer. It is never free to open up fully unless the pointer is moved to the right hand end of the cam 61.

It is now merely necessary to utilize the movement of the cam arm to effect the actuation of a recording device such as a pen and/or of a control apparatus.

In the case of a control apparatus, the cam arm could for example be provided with a shutter 27 which is arranged to intercept to an extent dependent on its position a jet of air passing between nozzles 28, 29 the jet of air being utilized to effect actuation of a diaphragm or piston movement of which effects control of the quantity to be controlled.

The circuit arrangements shown in Figs. 2 and 3 are particularly suited for use in providing a record of the value of the variable, in that if the galvanometer 1 is sensitive to, for example, a plus or minus 10 degree F. change of temperature at any given balance point, the balance point can be shifted by means provided for this purpose to any part of the available range so that the same instrument can be used for recording temperatures between say 20 and 40 degrees F. and 820 and 840 degrees F.

Means may be provided for indicating and/or for recording on a diagram the point to which the controlling and/or recording apparatus is set. For accurate adjustment of the set recording or controlling temperature, the potentiometer or resistance may be provided with a fine adjustment or the suspension of the galvanometer may be turned round to alter the free position of the galvanometer pointer.

What we claim is:—

1. In an apparatus for indicating, recording, or controlling a physical quantity such as temperature or flow, an electrical circuit including a potentiometer, a resistance connected with one end of said potentiometer, a source of potential connected with the other end of said potentiometer, a variable resistance connected with the other side of said source of potential, said variable resistance being electrically connected with the aforesaid resistance, a series path including a plurality of resistors, said series path being connected in shunt with the series circuit formed by said potentiometer and said first mentioned resistance, a series circuit including a thermocouple and a galvanometer connected through adjustable taps with said potentiometer and with one of the resistors in said series path, a deflecting pointer actuated by said galvanometer, a circuit including a standard cell and a galvanometer electrically connected in series between the end of said potentiometer which connects to said source of potential and an adjustable tap on said resistance.

2. In an apparatus for indicating, recording, or controlling a physical quantity such as temperature or flow, an electrical circuit including a potentiometer, a resistance connected with one end of said potentiometer, a source of potential connected with the other end of said potentiometer, a variable resistance connected with the other side of said source of potential, said variable resistance being electrically connected with the aforesaid resistance, a series circuit including a multiplicity of thermocouples and a galvanometer connected through adjustable taps with said potentiometer, a deflecting pointer actuated by said galvanometer, a circuit including a standard cell and a galvanometer electrically connected in series between the end of said potentiometer which connects to said source of potential and an adjustable tap on said resistance.

3. In an apparatus for indicating, recording, or controlling a physical quantity such as temperature or flow, an electrical circuit including a potentiometer, a resistance connected with one end of said potentiometer, a source of potential connected with the other end of said potentiometer, a pair of resistors connected in series and disposed in parallel across the circuit constituted by said resistance and potentiometer, a variable resistance connected with the other side of said source of potential, said variable resistance being electrically connected with the aforesaid resistance, a series circuit including a thermocouple and a galvanometer connected through adjustable taps with said potentiometer, a deflecting pointer actuated by said galvanometer, a circuit including a standard cell and a galvanometer electrically connected in series between the end of said potentiometer which connects to said source of potential and an adjustable tap on said resistance.

4. In an apparatus for indicating, recording, or controlling a physical quantity such as temperature or flow, a potentiometer system, a thermocouple system, a galvanometer having a deflecting pointer controlled according to the operation of said thermocouple system and responsive to an out-of-balance condition at different predetermined values of the quantity, and a pair of balancing resistors connected with said potentiometer system, the effective value of one of said resistors being directly controlled according to the angular deflection of said deflecting pointer.

5. In an apparatus for indicating, recording, or controlling a physical quantity such as temperature or flow, an electrical circuit including a potentiometer having a pair of separate arms, a main resistor and an adjusting resistor disposed in each of said arms, a connection between said main resistor and a source of potential, a variable resistance connected across the other side of said potential, a calibrating resistance connected with said variable resistance at one end and connecting at the opposite end thereof to a point in said potentiometer circuit between the adjusting resistors in each of the arms in said electrical circuit, a series circuit including a pair of thermocouples and a galvanometer, the end of one of said thermocuples being connected at a point between the main and adjusting resistors in one of the arms of said electrical circuit and said galvanometer being connected to an adjustable tap in the main resistor of the other of the arms of said electrical circuit, and a circuit including a standard cell and a galvanometer connected between the point between the main resistors which connect to the first mentioned source of potential and an adjustable tap on said calibrating resistance.

6. In an apparatus for indicating, recording, or controlling a physical quantity such as temperature or flow, an electrical circuit including a pair of parallel arms, a main resistor and a compensating resistor connected in series in one of said arms, a pair of fixed resistors interconnected through a variable resistor disposed in the other of said arms, a source of potential having one side thereof connected to one junction of said arms, a variable resistor connected to the other side of said source of potential, a calibrated resistance connected to said variable resistor at one end and connected to the opposite juncture of said arms at the other end, a pair of thermocouples and a galvanometer disposed in a series circuit, one end of said series circuit being connected between the main and compensating resistors in the first of said arms and the other end of said series circuit being connected to the adjustable resistance in the other of said arms, and a circuit including a standard cell and a galvanometer connected between an adjustable tap on said calibrated resistance and the junction of said arms which connects to said first mentioned source of potential.

7. In an apparatus for indicating, recording, or controlling a physical quantity such as temperature or flow, a potentiometer comprising a pair of arms each including a fixed resistance and a variable resistor electrically connected in series, an indicator including a rotor carrying a pair of coils movable in a magnetic field, a connection between an intermediate point between said coils and a point intermediate the fixed resistance in each of said arms, a connection between the end of one of said coils and a movable tap on the variable resistor in one of said arms, and a connection between the end of the other of said coils and a movable tap on the variable resistor in the other of said arms, said circuits operating according to variations impressed thereon for effecting a turning torque with respect to said coils for correspondingly moving said deflecting pointer.

8. In an apparatus for indicating, recording, or controlling, a physical quantity such as temperature or flow, a potentiometer system including a pair of balanced branch circuits, an adjustable resistor symmetrically disposed in portions of one of said branch circuits, a thermocouple system, a galvanometer connected with said thermocouple system, a deflecting pointer on said galvanometer and a switch arm carried by said galvanometer and operative to variably control the effective value of one of said resistors in accordance with the deflection of said galvanometer under control of said thermocouple system.

JOHN LAWRENCE HODGSON.
GILES PHILIP ELIOT HOWARD.
ALEXANDER IVANOFF.